(12) United States Patent
Li et al.

(10) Patent No.: US 7,505,741 B2
(45) Date of Patent: Mar. 17, 2009

(54) PROCESSING DIVERSITY SIGNALS USING A DELAY

(75) Inventors: Yingxue Li, Bethlehem, PA (US); Haim Harel, New York, NY (US)

(73) Assignee: Magnolia Broadband Inc., Bedminster, NJ (US)

( * ) Notice: Subject to any disclaimer, the term of this patent is extended or adjusted under 35 U.S.C. 154(b) by 867 days.

(21) Appl. No.: 10/696,988

(22) Filed: Oct. 30, 2003

(65) Prior Publication Data

US 2004/0092235 A1 May 13, 2004

Related U.S. Application Data

(60) Provisional application No. 60/422,925, filed on Nov. 1, 2002.

(51) Int. Cl.
*H04B 1/02* (2006.01)
(52) U.S. Cl. ...................................... 455/101; 370/328
(58) Field of Classification Search ................. 375/140, 375/147, 239, 146, 141, 130
See application file for complete search history.

(56) References Cited

U.S. PATENT DOCUMENTS

| | | | |
|---|---|---|---|
| 3,842,352 A | 10/1974 | Cote | 325/56 |
| 5,479,397 A | 12/1995 | Lee | 370/18 |
| 5,642,353 A | 6/1997 | Roy, III et al. | |
| 5,648,983 A | 7/1997 | Kostic et al. | 375/206 |
| 5,781,541 A | 7/1998 | Schneider | 370/335 |
| 5,784,364 A | 7/1998 | Ahn et al. | 370/335 |
| 5,832,044 A | 11/1998 | Sousa et al. | |
| 5,956,367 A | 9/1999 | Koo et al. | 375/206 |
| 5,991,330 A | 11/1999 | Dahlman et al. | |

(Continued)

FOREIGN PATENT DOCUMENTS

EP            0 986 193            3/2000

(Continued)

OTHER PUBLICATIONS

Bart Smolders, *Member, IEEE*, and Grant Hampson, "*Deterministic RF Nulling in Phased Arrays for the Next Generation of Radio Telescopes*", IEEE Transactions on Antennas and Propagation, vol. XX, No. Y, Month 1999, pp. 100-119, Oct. 4, 1999.

(Continued)

*Primary Examiner*—Lester Kincaid
*Assistant Examiner*—Phuoc Doan
(74) *Attorney, Agent, or Firm*—Pearl Cohen Zedek Latzer, LLP

(57) ABSTRACT

Processing a downlink signal includes receiving a downlink signal at the antennas of a mobile device, where each antenna generates a diversity signal associated with the downlink signal, and where the downlink signal includes information. Diversity signals are generated and a delay of less than one chip duration is applied to at least one of the diversity signals. The diversity signals are then processed to obtain the information. Processing a transmit signal includes receiving a transmit signal at a splitter, where the transmit signal includes information. The transmit signal is split into split signals. At least one delay is applied to at least one of the split signals to yield transmit diversity signals, and the transmit diversity signals are transmitted.

2 Claims, 3 Drawing Sheets

U.S. PATENT DOCUMENTS

| | | | |
|---|---|---|---|
| 6,009,307 A | 12/1999 | Granata et al. | 455/13.3 |
| 6,069,884 A | 5/2000 | Hayashi et al. | 370/335 |
| 6,122,333 A | 9/2000 | Nagashima | 375/347 |
| 6,125,109 A | 9/2000 | Fuerter | 370/315 |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,275,484 B1 | 8/2001 | Lynch et al. | 370/342 |
| 6,314,127 B1 | 11/2001 | Lynch et al. | 375/144 |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 6,417,712 B1 | 7/2002 | Beards et al. | 327/248 |
| 6,418,135 B1 | 7/2002 | Lomp et al. | 370/342 |
| 6,452,918 B1 | 9/2002 | Lomp et al. | 370/342 |
| 6,452,989 B1 | 9/2002 | Friedman | 375/347 |
| 6,463,048 B1 | 10/2002 | Garyantes | 370/342 |
| 6,466,567 B2 | 10/2002 | Lomp et al. | 370/342 |
| 6,492,942 B1 | 12/2002 | Kezys | |
| 6,636,495 B1 | 10/2003 | Tangemann | |
| 6,704,370 B1 | 3/2004 | Chheda et al. | |
| 6,745,009 B2 | 6/2004 | Raghothaman | |
| 6,810,070 B1 * | 10/2004 | Sourour | 375/140 |
| 6,810,264 B1 | 10/2004 | Park et al. | |
| 6,859,643 B1 | 2/2005 | Ma et al. | |
| 6,882,228 B2 | 4/2005 | Rofougaran | |
| 2001/0003096 A1 | 6/2001 | Lee | 455/562 |
| 2001/0019592 A1 | 9/2001 | Solondz | 375/267 |
| 2002/0010002 A1 | 1/2002 | Heinila | 455/526 |
| 2002/0057745 A1 | 5/2002 | Friedman | 375/295 |
| 2002/0064246 A1 | 5/2002 | Kelkar et al. | 375/347 |
| 2002/0093932 A1 | 7/2002 | Lomp et al. | 370/342 |
| 2002/0172261 A1 | 11/2002 | Hershey et al. | 375/130 |
| 2002/0172265 A1 | 11/2002 | Kenney | 375/148 |
| 2003/0112880 A1 | 6/2003 | Walton et al. | |
| 2003/0142726 A1 * | 7/2003 | Eltawil et al. | 375/146 |
| 2004/0048584 A1 | 3/2004 | Vaidyanathan et al. | |
| 2004/0085239 A1 | 5/2004 | Ukena et al. | |
| 2005/0059355 A1 | 3/2005 | Liu | |
| 2005/0143113 A1 | 6/2005 | Lee et al. | |

FOREIGN PATENT DOCUMENTS

| | | |
|---|---|---|
| EP | 0 969 610 A2 | 5/2000 |
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| WO | WO 97/24818 | 10/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

Wichman, R., et al., "*Transmit Diversity in the WCDMA System*", XP-001038053, *International Journal of Wireless Information Networks*, vol. 6, No. 3, ISSN: 1068-9605, pp. 171-180, Jul. 1999.

PCT, Notification of Transmittal of the International Search Report or the Declaration, International Application No. PCT/US 03/34461, 9 pages, Aug. 16, 2004.

Holma, H., Toskala, A., "WCDMA for UMTS, *3.4 Multipath Radio Channels and Rake Reception,*" Wiley and Sons XP002272463, pp. 30-33, 2001.

PCT, Invitation to Pay Additional Fees, Annex to Form PCT/ISA/206 Communication Relating to the Results of the Partial International Search, International Application No. PCT/US03/34461, 4 pages, Oct. 5, 2004.

* cited by examiner

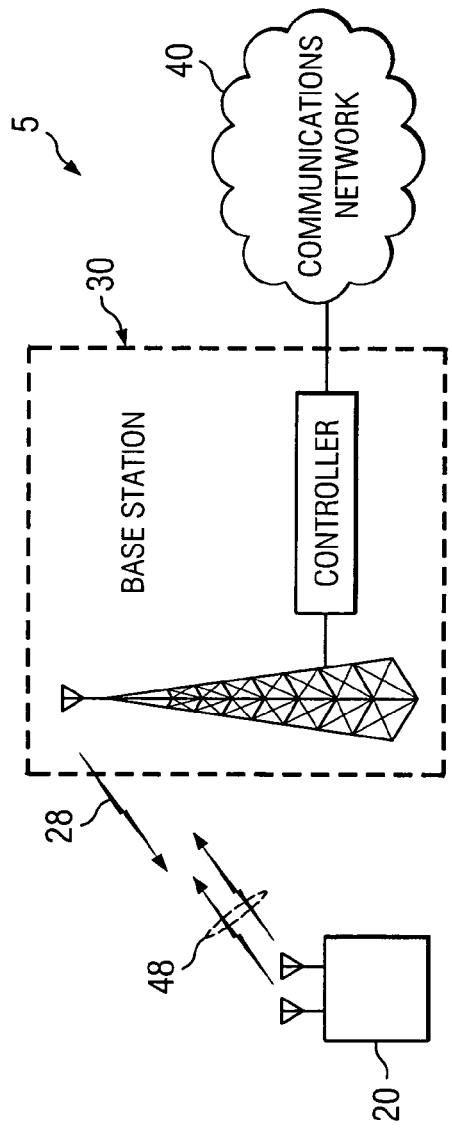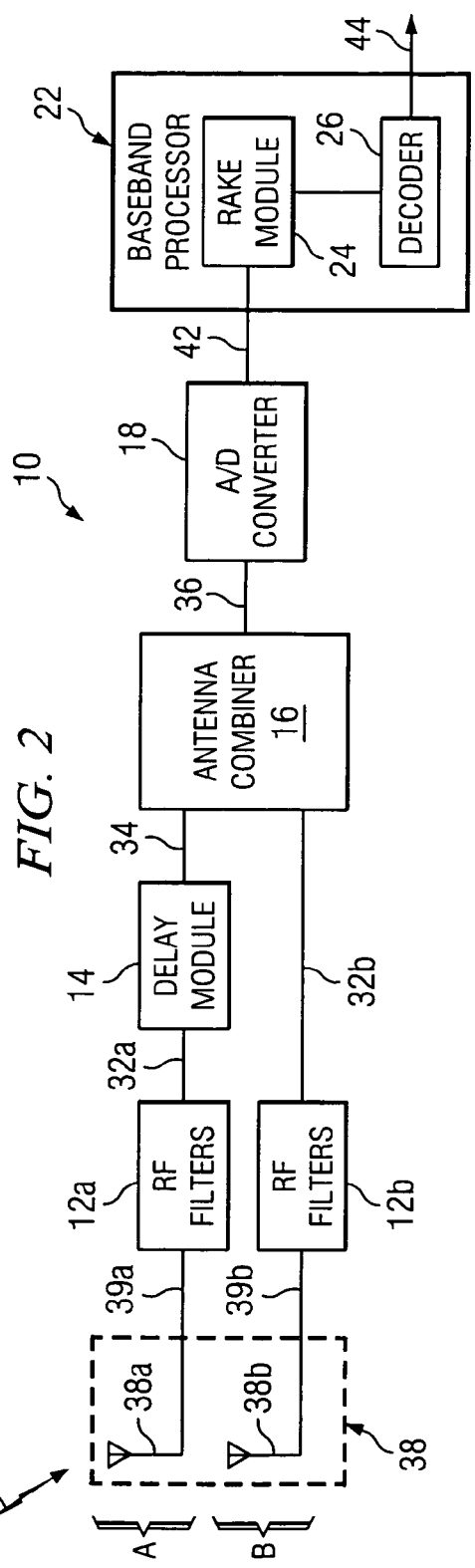

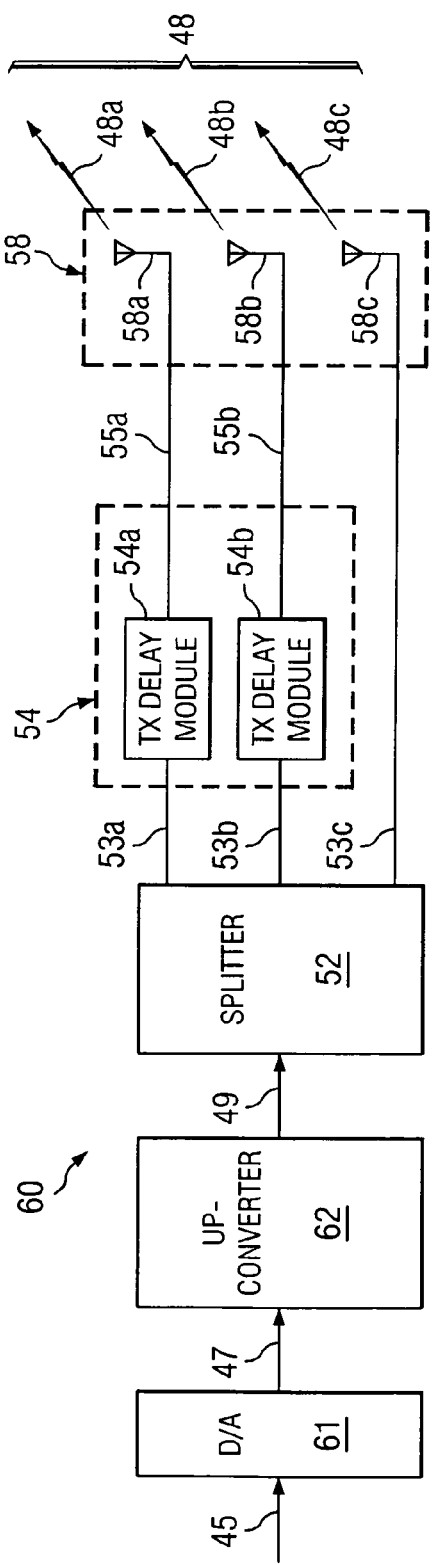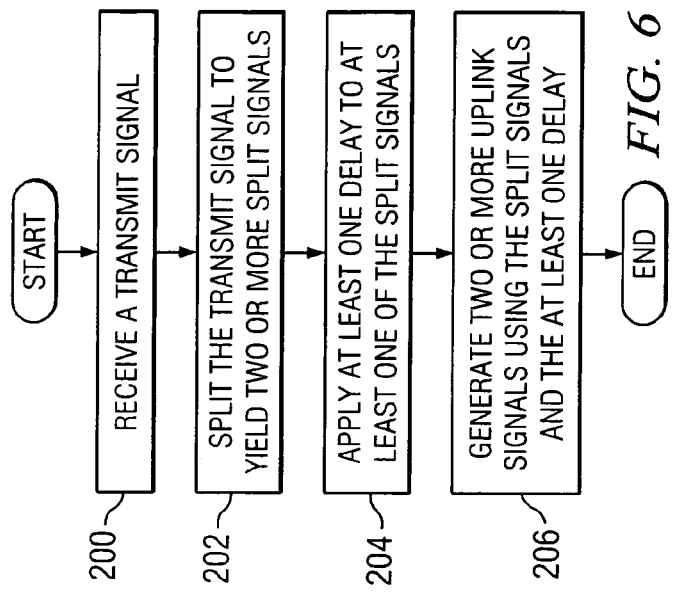

PROCESSING DIVERSITY SIGNALS USING A DELAY

RELATED APPLICATION

This application claims benefit under 35 U.S.C. § 119(e) of U.S. Provisional Application Ser. No. 60/422,925, entitled "METHOD AND SYSTEM FOR COMBINING SIGNALS USING A DELAY UNIT," filed Nov. 1, 2002, by Yingxue Li, et al.

TECHNICAL FIELD OF THE INVENTION

This invention relates generally to the field of telecommunication systems and more specifically to processing diversity signals using a delay.

BACKGROUND OF THE INVENTION

Diversity antenna systems typically employ multiple antennas that may generate and/or may receive diversity signals associated with a common source. Correctly combining diversity signals may improve the quality of reception and/or transmission. The method of combining the diversity signals may depend on the speed of the mobile environment.

Known techniques for combining diversity signals may involve using a feedback loop to adjust the characteristics of the diversity signals before combining. These known techniques, however, rely on a feedback loop that may not be effective in high speed mobile environments because signal characteristics change faster than the feedback loop speed. Additionally, implementing a feedback loop, such as a closed loop system, may result in higher cost of the mobile device. Consequently, known techniques for processing diversity signals may be unsatisfactory in certain situations.

SUMMARY OF THE INVENTION

In accordance with the present invention, disadvantages and problems associated with previous techniques for processing diversity signals may be reduced or eliminated.

According to one embodiment, processing a downlink signal includes receiving a downlink signal at the antennas of a mobile device, where each antenna generates a diversity signal associated with the downlink signal, and where the downlink signal includes information. Diversity signals are generated and a delay of less than one chip duration is applied to at least one of the diversity signals. The diversity signals are then processed to obtain the information.

According to another embodiment, processing a transmit signal includes receiving a transmit signal at a splitter, where the transmit signal includes information. The transmit signal is split into a plurality of split signals. At least one delay is applied to at least one of the split signals to yield a plurality of transmit diversity signals. The plurality of transmit diversity signals are transmitted by antennas.

Certain embodiments of the invention may provide one or more technical advantages. A technical advantage of one embodiment may be that a rake receiver module distinguishes between two or more diversity signals in high speed mobile environments by introducing a delay of less than one chip duration, such as between approximately 0.5 and one chip duration, at one path of the received diversity signals. Another technical advantage of an embodiment may be that the cost of the mobile device may be reduced by using only one rake receiver module for delaying at least one signal and combining the diversity signals. Yet another technical advantage of an embodiment may be that a base station receives uplink signals at different times by introducing a delay at one or more antenna paths of a transmit diversity system. Receiving the uplink signals at different times may allow the base station receiver to distinguish between the diversity signals in order to yield a better quality of reception.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram of an embodiment of a communication system incorporating the use of a diversity antenna system that processes diversity signals using a delay;

FIG. 2 is a block diagram of an embodiment of a diversity receiver that may be used with the communication system of FIG. 1;

FIG. 5 is a block diagram of an embodiment of a diversity transmitter that may be used with the communication system of FIG. 1; and FIG. 6 is a flowchart of an embodiment of a method for processing a transmit signal.

DETAILED DESCRIPTION OF THE DRAWINGS

Figure 3:
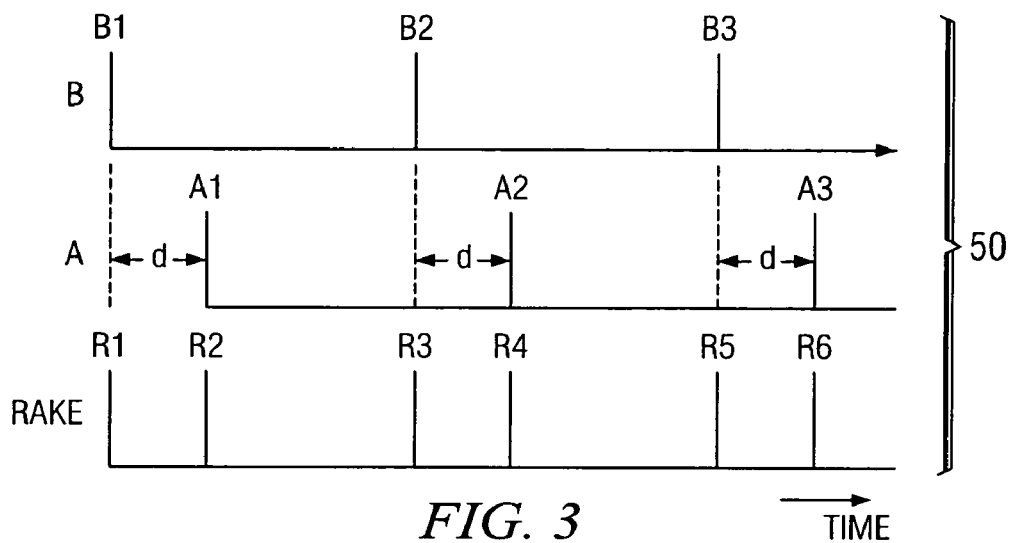
FIG. 3 is a timing diagram illustrating an example of channel path signals that may be used with the diversity receiver of FIG. 2.

Embodiments of the present invention and its advantages are best understood by referring to FIGS. 1 through 6 of the drawings, like numerals being used for like and corresponding parts of the various drawings.

FIG. 1 is a block diagram of an embodiment of a communication system 5 incorporating the use of a diversity antenna system that processes diversity signals using a delay. In operation, a mobile device 20 transmits uplink signals 48 carrying information to a base station 30, which forwards the information to communication network 40. Mobile device 20 may receive a downlink signal 28 that mobile device 20 processes to obtain the information encoded in downlink signal 28.

Mobile device 20 may be equipped with a diversity receiver that processes downlink signal 28 and a diversity transmitter that generates uplink signals 48. A diversity receiver is more particularly described with reference to FIG. 2 and a diversity transmitter is more particularly described with reference to FIG. 4. Mobile device 20 may comprise, for example, a personal digital assistant, a cellular telephone, a mobile handset, or any other device suitable for communicating with communication system 5. Mobile device 20 may utilize, for example, Code Division Multiple Access (CDMA) technology or any other suitable mobile communication technology. Downlink signal 28 and uplink signals 48 may comprise any suitable signal modulated by a carrier such as data packets communicating information such as data, voice, video, multimedia, any other suitable type of information, or any combination of the preceding.

Base station 30 provides mobile device 20 with access to communication system 5. Base station 30 communicates signals to and from mobile device 20 and manages the local operation of base station controllers. The wireless link between mobile device 20 and base station 30 is typically a radio frequency link that may be cellular in network organization. Base station 30 may include antenna equipment suitable for transmitting downlink signal 28 to mobile device 20 and receiving uplink signals 48 from mobile device 20. Base station 30 may also include a transceiver that decodes the information encoded in uplink signals 48 and encodes the information transmitted in downlink signal 28.

Communication network 40 may comprise a global computer network such as the Internet, an extranet, a corporate Virtual Private Network (VPN), a local area network (LAN), a metropolitan area network (MAN), a wide area networks (WAN), or any other suitable communication network. According to one embodiment, communication network 40 may comprise a private network that links base stations 30 of communication system 5.

A block diagram of an embodiment of a diversity receiver that may be used with the communication system of FIG. 1 is described with reference to FIGURE-. A timing diagram illustrating an example of channel path signals that may be used with the diversity receiver of FIG. 2 is described with reference to FIG. 3. A flowchart of an embodiment of a method for processing a receive signal is described with reference to FIG. 4. A block diagram of an embodiment of a diversity transmitter that may be used with the communication system of FIG. 1 is described with reference to FIG. 5. A flowchart of an embodiment of a method for processing a transmit signal is described with reference to FIG. 6. "Each" as used in this document refers to each member of a set or each member of a subset of a set.

FIG. 2 is a block diagram of an embodiment of a diversity receiver 10 that may be used with the communication system 5 of FIG. 1. In operation, diversity receiver 10 receives downlink signal 28 to generate receive diversity signals 39, filters receive diversity signals 39 to yield filtered signals 32, delays at least one filtered signal 32 to yield at least one receive delayed signal 34, combines receive delayed signal 34 and filtered signal 32*b* to yield a combined signal 36, converts combined signal 36 to yield a converted signal 42, and processes converted signal 42 at a baseband processor 22 to generate information 44. According to the illustrated embodiment, diversity receiver 10 includes receive antennas 38, Radio Frequency (RF) filters 12, a receive delay module 14, an antenna combiner 16, an analog-to-digital (A/D) converter 18, and a baseband processor 22 coupled as shown in FIG. 2.

Receive antennas 38 receive downlink signal 28 and generate receive diversity signals 39 from downlink signal 28. According to one embodiment, each receive antenna 38 may be similar to or different from each other. For example, antenna 38*a* may be an internal printed antenna, while receive antenna 38*b* may be an external stubby antenna. Any other suitable type of antenna may be used as receive antennas 38, for example, wipe antennas, patch antennas, and magnetic antennas may be used.

According to the illustrated embodiment, each receive antenna 38 is associated with a channel path. For example, receive antenna 38*a* is associated with a channel path A, and receive antenna 38*b* is associated with channel path B. For each channel path, receive antennas 38 generate a receive diversity signal 39. For example, at channel path A, receive antenna 38*a* generates receive diversity signal 39*a*, and at channel path B, receive antenna 38*b* generates receive diversity signal 39*b*. Receive diversity signals 39*a* and 39*b* may have any suitable configuration. For example, receive antennas 38 may be spatially separated by a distance of more than 0.15 wavelength so that diversity signals 39*a* and 39*b* are statistically uncorrelated.

RF filters 12 filter receive diversity signals 39 to yield filtered signals 32. According to the illustrated embodiment, receive diversity signal 39*a* is filtered by RF filter 12*a*, and receive diversity signal 39*b* is filtered by RF filter 12*b*. According to one embodiment, RF filters 12 include duplexors and diplexors. In general, a duplexor comprises a filter that filters signals according to the frequency separation of the transmit and receive frequencies, which may allow a transmitter and receiver to use a common antenna. A diplexor may comprise a switch, a filter, or any suitable device for separating signal frequencies according to different frequency bands. Examples of frequency bands include the 800 MHz band and the 1.9 GHz band. Such diplexor operation may be useful for mobile devices 20 capable of operating in dual band systems.

According to one embodiment, a duplexor at RF filters 12 may be configured to filter receive frequencies of receive diversity signals 39. A diplexor separates the receive diversity signals 39 to obtain a particular frequency band at which the mobile device 20 operates. Other filters may be used as RF filters 12 without deviating from the scope of the invention. Any suitable number of antennas 38 may be used in combination with any suitable number of RF filters 12 to produce any suitable number of filtered signals 39 for processing by diversity receiver 10.

Receive delay module 14 receives at least one filtered signal 32 to yield at least one delayed signal 34. According to the illustrated embodiment, receive delay module 14 introduces a less than one chip delay at filtered signal 32*a* to yield delayed signal 34. A less than one chip delay comprises a delay of less than approximately one microsecond. An example of a less than one chip duration may comprise a duration of between approximately 0.5 and one chip. Introducing the less than one chip delay to filtered signal 32*a* allows for further time separation of the receive diversity signals 39. This time separation may result in a more streamlined diversity receiver 10 because filtered signals 32 and delayed signal 34 may be combined blindly and then separated by a single rake receiver module 24 instead of by rake receiver modules for each channel path of diversity receiver 10. Other suitable delays may be introduced at any stage of diversity receiver 10 by receive delay module 14 without departing from the scope of the invention. For example, less than one microseconds may be introduced at any signal and at any stage before combining the signals to allow a rake receiver module 24 to distinguish the multipath signals. A timing diagram that illustrates examples of delayed signal 34 and filtered signal 32*b* as received by rake receiver module 24 is described with reference to FIG. 3.

FIG. 3 is a diagram of an example timing of channel path signals that may be used with diversity receiver 10 of FIG. 2. According to the illustrated embodiment, timing chart 50 illustrates signals A1, A2, and A3 received at channel path A and signals B1, B2, and B3 received at channel path B after the delay. Assuming that signals A1 and B1 have a common source, for example downlink signal 28, diversity receiver 10 introduces delay d to allow rake receiver module 24 to perceive each signal R1 and R2 at different times. Although each delay d has been described as being uniform, for example, delay of less than one chip, delay d may vary. For example, delay d may be calculated according to signal criteria such as signal strength, signal-to-noise ratio, timing relationship between A1, A2, and A3, or any other suitable criteria so that a delay d used for delaying signal A1 in relation with signal B1 may be different from the delay d used for delaying signal A2 in relation with signal B2. Additionally, although two channel paths have been used to describe examples of diversity receiver 10, any suitable number of channel paths may be used without departing from the scope of the invention.

Referring back to FIG. 2, antenna combiner 16 combines delayed signal 34 and at least one filtered signal 32b to yield a combined signal 36. In general, antenna combiner 16 combines multiple signals to generate one combined signal. According to the illustrated embodiment, antenna combiner 16 sums delayed signal 34 and filtered signal 32b in order to send the combined signal 36 to a baseband processor 22 for processing. By combining delayed signal 34 and filtered signal 32b, diversity receiver 10 requires only one rake receiver module 24 to process combined signal 36 because the signals are distinguishable by the introduced delay.

A/D converter 18 converts combined signal 36 to yield a converted signal 42. According to the illustrated embodiment, combined signal 36 comprises an analog signal, and converted signal 42 comprises a digital signal. A/D conversion, however, may occur at any stage and at any channel path of diversity receiver 10 without departing from the scope of the invention. For example, diversity receiver 10 may include an A/D converter 18 at each channel path before antenna combiner 16 in order to convert filtered signals 32 and/or delayed signal 34 before combining. Accordingly, any suitable number of A/D converters 18 may be used at diversity receiver 10 without departing from the scope of the invention.

Baseband processor 22 processes converted signal 42 to generate information 44. In another embodiment, baseband processor 22 may receive combined signal 36 to generate information 44. According to the illustrated embodiment, baseband processor 22 includes a rake receiver module 24 and a decoder 26. In general, a rake receiver module 24 may include a rake receiver that separates and despreads multipath components of a signal. Each multipath component is generally referred to as a finger. The rake receiver may coherently combine all the fingers. According to one embodiment, rake receiver module 24 may include at least a despreader, a channel estimator, and a multipath searcher to obtain and adjust the fingers according to received signals as is well known in the art. Rake receiver module 24 may include a signal combiner that coherently adds the adjusted fingers in order to yield a combined symbol signal according to maximal ratio combining techniques as is well known in the art. More, fewer, or other components may be used at rake receiver module 24 to perform the spreading and combining of the fingers without departing from the scope of the invention. Decoder 26 decodes the output of rake receiver module 24 to generate a decoded signal comprising information 44. According to one embodiment, decoder 26 comprises a Viterbi/Turbo decoder.

Modifications, additions, or omissions may be made to diversity receiver 10 without departing from the scope of the invention. For example, receive delay module 14 may be implemented at any suitable point of the receiver chain such as at the analog baseband or digital baseband portions of the receiver chain. As another example, baseband processor 22 may include other suitable logic modules to process combined signal 36 or converted signal 42 according to a wireless protocol used by communication system 5. As yet another example, RF filters 12 may be modified to couple receive antennas 38 with a diversity transmitter 60 in order to share common antennas between diversity receiver 10 and the diversity transmitter 60. Additionally, functions may be performed using any suitable logic comprising software, hardware, other logic, or any suitable combination of the preceding.

Figure 4:
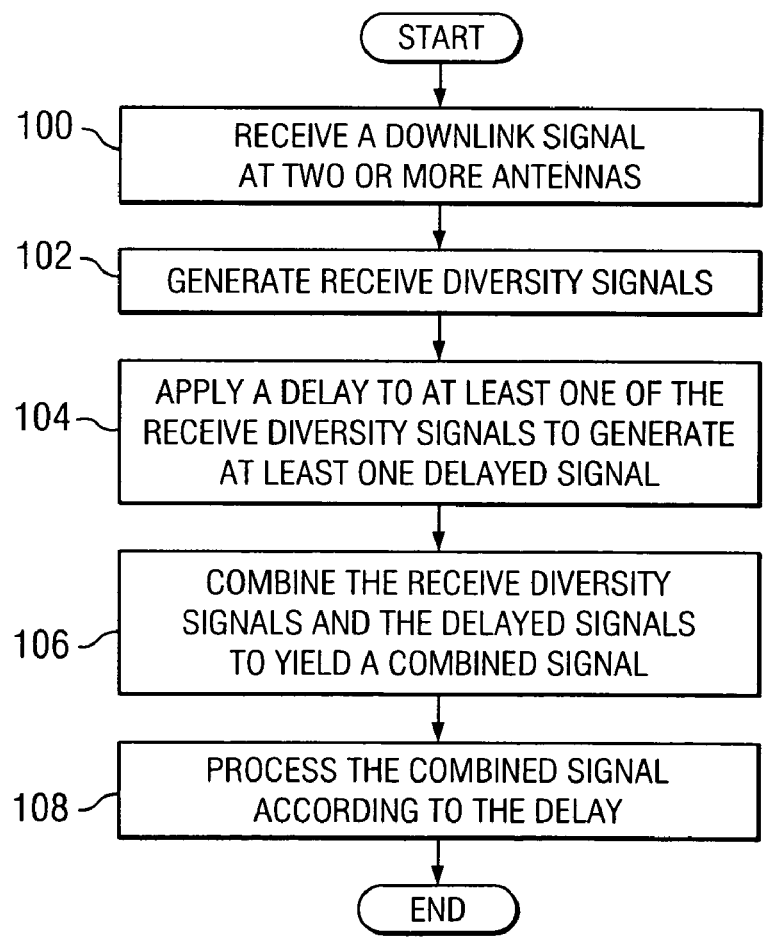
FIG. 4 is a flowchart of an embodiment of a method for processing a receive signal.

FIG. 4 is a flowchart of an embodiment of a method for processing a downlink signal 28. The method begins at step 100, where two or more receive antennas 38 receive downlink signal 28. At step 102, receive antennas 38 generate two or more receive diversity signals 39 that correspond to downlink signal 28. For example, each receive antenna 38 generates a receive diversity signal 39.

A receive delay module 14 applies a delay to at least one of the receive diversity signals 39 to generate delayed signal 34 at step 104. According to one embodiment, delay module 14 applies a delay of less than one chip to filtered signal 32a. In that embodiment, delayed signal 34 is delayed less than one microsecond from split signal 32b. At step 106, antenna combiner 16 combines receive diversity signal 32a and delayed signal 34 to yield a combined signal 36. According to one embodiment, antenna combiner 16 combines delayed signal 34 with the non-delayed receive diversity signals 32 in the time domain in order to generate a combined signal 36 that allows baseband processor 22 to perceive each signal received at each receive antenna 38.

Baseband processor 22 processes combined signal 36 using the delay, at step 108. According to one embodiment, rake receiver module 24 receives combined signal 36 and separates it into fingers. Rake receiver module 24 coherently combines the fingers to generate a combined symbol level signal. Decoder 26 may decode the combined symbol level signal to generate information 44. After processing combined signal 36, the method terminates.

Steps may be modified, added, and omitted without departing from the scope of the invention. For example, a step may be added where A/D converter 18 converts combined signal 36 into converted signal 42 before processing combined signal 36 at step 108. As another example, a step may be added where receive diversity signals 39 may be filtered at RF filters 12 to yield filtered signals 32 before applying a delay at step 104. Additionally, functions may be performed using any suitable logic comprising software, hardware, other logic, or any suitable combination of the preceding.

FIG. 5 is a block diagram of an embodiment of a diversity transmitter 60 that may be used with communication system 5 of FIG. 1. Digital signal 45 may be converted into a baseband analog signal 47 by a digital-to-analog (D/A) converter. Baseband signal 47 may be upconverted into an RF signal 49 by an up-converter 62. Diversity transmitter 60 splits RF signal 44 to generate split signals 53, applies a delay to at least one split signal 53 to generate at least one transmit delayed signal 55, and transmits delayed signals 55 and split signal 53c using transmit antennas 58 that generate uplink signals 48. According to the illustrated embodiment, diversity transmitter 60 includes a splitter 52, at least one transmit delay module 54, and transmit antennas 58 coupled as shown.

Splitter 52 splits transmit signal 46 into two or more split signals 53. According to one embodiment, split signals 53 are substantially similar to transmit signal 46. In the illustrated embodiment, splitter 52 splits transmit signal 46 into split signals 53a, 53b, and 53c. Diversity transmitter 60 may include any suitable number of splitters 52 for splitting transmit signal 46 into any suitable number of split signals 53.

Transmit delay module 54 introduces a delay at split signals 53. According to the illustrated embodiment, transmit delay module 54a introduces a delay of several microseconds, for example, two microseconds, at split signal 53a to yield transmit delayed signal 55a, and transmit delay module 54b introduces a greater delay of, for example, four microseconds, at split signal 53b to yield transmit delayed signal 55b. Each transmit delay module 54 may introduce any delay suitable for generating signals that may arrive at base station 30 at different times. Introducing a delay to at least one split signal 53 may result in temporal separation of the uplink signals 48, which may allow a rake receiver at base station 30 to effectively separate uplink signals 48. According to the illustrated embodiment, each transmit delay module 54 may comprise a buffer suitable for introducing a desired delay to a split signal 53. Transmit delay modules 54 may comprise any other device, processor, or logic unit suitable for introducing a delay.

Transmit antennas 58 receive transmit delayed signals 55 and the split signal 53c to generate uplink signals 48. According to the illustrated embodiment, transmit antennas 58 generate uplink signals 48 by radiating transmit delayed signals 55a and 55b and split signal 53c. Diversity transmitter 60 may include any suitable number of transmit antennas 58 to transmit any suitable number of uplink signals 48 without departing from the scope of the invention. According to one embodiment, each transmit antenna 58 may be similar to or different from each other. For example, transmit antenna 58a may be an internal printed antenna, while transmit antenna 58b may be an external stubby antenna. Any other suitable type of antenna may be used as transmit antennas 58, for example, wipe antennas, patch antennas, and magnetic antennas may be used. According to another embodiment, transmit antennas 58 may be similar to receive antennas 38 such as when diversity receiver 10 and diversity transmitter 60 share common antennas. Transmit antennas 58 may, however, be different from receive antennas 38.

Modifications, additions, or omissions may be made to diversity transmitter 60 without departing from the scope of the invention. For example, diversity transmitter 60 may include more or fewer transmit diversity modules 54 without departing from the scope of the invention. As another example, diversity transmitter 60 may include other suitable modules for processing signals without departing from the scope of the invention. In one embodiment, diversity transmitter 60 may include a digital-to-analog converter for converting transmit signal 46, split signals 53, or delayed signals 55 from analog to digital form. As yet another example, splitter 52 and transmit delay modules 54 may be implemented so that the delays may be introduced as the signal is split.

FIG. 6 is a flowchart of an embodiment of a method for processing a transmit signal 46. The method begins at step 200, where splitter 52 receives transmit signal 46. At step 202, splitter 52 splits transmit signal 46 to yield two or more split signals 53. According to the illustrated embodiment, splitter 52 splits transmit signal 46 into split signals 53a, 53b, and 53c. Split signals 53 may be substantially similar to transmit signal 46.

Transmit delay modules 54 apply at least one delay to at least one of the split signals 53. According to one embodiment, diversity transmitter 60 includes transmit delay module 54a for applying a first delay at split signal 53a and transmit delay module 54b for applying a second delay at split signal 53b. As was described with reference to FIG. 4, the first delay may comprise several microseconds, for example, two microseconds, and the second delay may comprise several microseconds more than the first delay, for example, four microseconds. Any other suitable time period may be selected as the first delay and the second delay. According to one embodiment, the first delay may be selected from a range between approximately 0.25 microseconds and eight microseconds, and the second delay may be selected from a range between approximately 0.5 microsecond and ten microseconds.

At step 206, transmit antennas 58 generate two or more uplink signals 48 using split signals 53 and the at least one delay. According to one embodiment, transmit antenna 58a generates uplink signal 48a corresponding to delayed transmit signal 55a, transmit antenna 58b generates uplink signal 48b corresponding to transmit delayed signal 55b, and transmit antenna 58c generates uplink signal 48c corresponding to split signal 53c. Transmit antennas 58 may generate more or fewer transmit delayed signals 55 without departing from the scope of the invention. After generating two or more uplink signals 48, the method terminates.

Steps may be modified, added, or omitted without departing from the scope of the invention. The splitter and delay unit may occur at any stage of transmitter chain. For example, the splitter and/or delay unit may be placed before the digital-to-analog converter. Steps may be performed in any suitable order. For example, splitting transmit signal 46 to yield two or more split signals 53 at step 202 may be performed substantially simultaneously with applying at least one delay to at least one of the split signals 53b at step 204.

Certain embodiments of the invention may provide one or more technical advantages. A technical advantage of one embodiment may be that a rake receiver module distinguishes between two or more diversity signals in high speed mobile environments by introducing less than one chip delay at one path of the received diversity signals. Another technical advantage of an embodiment may be that the cost of the mobile device may be reduced by using only one rake receiver module for delaying at least one signal and combining the diversity signals. Yet another technical advantage of an embodiment may be that a base station receives uplink signals at different times by introducing a delay at one or more antenna paths of a transmit diversity system. Receiving the uplink signals at different times may allow the base station receiver to distinguish between the diversity signals in order to yield a better quality of reception.

Although an embodiment of the invention and its advantages are described in detail, a person skilled in the art could make various alterations, additions, and omissions without departing from the spirit and scope of the present invention as defined by the appended claims.

What is claimed is:

1. A system for processing receive diversity signals, comprising:
   a plurality of antennas operable to:
      receive a downlink signal, the downlink signal comprising information; and
      generate a plurality of diversity signal associated with the downlink signal, each of the plurality of antennas operable to generate a diversity signal of the plurality of diversity signals;
   a plurality of filters, each filter of the plurality of filters coupled to an antenna of the plurality of antennas and operable to filter each of the diversity signals received from the plurality of antennas;
   a delay module coupled to at least one of the plurality of filters and operable to apply a delay to at least one of the plurality of diversity signals, the delay being less than one chip duration, the delay comprising a delay of 0.4 to 0.8 microseconds;
   an antenna combiner operable to:
      sum the plurality of diversity signals after applying the delay; and
      yield a combined signal comprising the delayed at least one of the plurality of diversity signals;

an analog-to-digital converter operable to convert the combined signal from analog mode to digital mode; and a processor coupled to the delay module and operable to process the combined signal using the delay to obtain the information, the delay operable to allow at least one multipath signal associated with the downlink signal to be distinguishable, the processor comprising a baseband processor, the baseband processor comprising:

a rake receiver module operable to:

separate the combined signal in the time domain to yield a plurality of fingers, the plurality of fingers corresponding to the plurality of diversity signals, at least one finger of the plurality of fingers comprising the delay; and coherently combine the plurality of fingers to yield a combined symbol signal, the combined symbol signal corresponding to the downlink signal; and a decoder coupled to the rake receiver module and operable to decode the combined symbol signal to generate the information.

2. A system for processing a transmit signal, comprising:

a splitter operable to:

receive a transmit signal, the transmit signal comprising information; and split the transmit signal into a plurality of split signals;

a delay module coupled to the splitter and operable to:

apply at least one delay to at least one of the plurality of split signals to yield a plurality of transmit diversity signals, the delay module comprising a buffer operable to introduce the at least one delay, the at least one delay comprising a first delay and a second delay, the first delay being less than the second delay;

introduce the first delay at a first split signal of the plurality of split signals, the first delay comprising a delay in the range between 0.25 microseconds and five microseconds; and introduce the second delay at a second split signal of the plurality of split signals, the second delay comprising a delay in the range between 0.5 microseconds and ten microseconds; and a plurality of antennas operable to transmit the plurality of transmit diversity signals in order to process the plurality of transmit diversity signals, the transmit diversity signals comprising the information.

* * * * *